United States Patent [19]

Tanimoto et al.

[11] Patent Number: 4,708,992
[45] Date of Patent: Nov. 24, 1987

[54] RUBBER COMPOSITIONS
[75] Inventors: Yoshio Tanimoto; Kohichi Iketani, both of Chiba, Japan
[73] Assignee: Sumitomo Chemical Company, Limited, Osaka, Japan
[21] Appl. No.: 804,844
[22] Filed: Dec. 5, 1985
[30] Foreign Application Priority Data Dec. 14, 1984 [JP] Japan ................................ 59-265133
Dec. 24, 1984 [JP] Japan ................................ 59-278579

[51] Int. Cl.$^4$ .......................... C08L 23/16; C08L 9/00
[52] U.S. Cl. ..................................... 525/313; 525/192; 525/232; 525/289
[58] Field of Search ................. 525/313, 192, 232, 289
[56] References Cited

U.S. PATENT DOCUMENTS 3,281,389 10/1966 Hirshfield ............................ 525/236
3,451,962 6/1969 Auler et al. ......................... 525/232
3,514,417 5/1970 Bickel et al. ....................... 525/232
3,578,624 5/1971 Cluff .
3,641,211 2/1972 Strange et al. ...................... 525/192
3,646,169 2/1972 Wirth .................................. 525/192
3,658,732 4/1972 Ballini et al. ....................... 525/192
3,878,153 4/1975 Driscoll .............................. 525/232
4,481,335 11/1984 Stark ................................... 525/313

FOREIGN PATENT DOCUMENTS 2641518 9/1976 Fed. Rep. of Germany .
3039719 4/1981 Fed. Rep. of Germany .
1165130 5/1958 France .
2075540 9/1971 France .
52-36143 3/1977 Japan .
1212964 11/1970 United Kingdom ................ 525/232
1541664 3/1979 United Kingdom .

Primary Examiner—Carman J. Seccuro
Attorney, Agent, or Firm—Cushman, Darby & Cushman

[57] ABSTRACT

A rubber composition excellent in processabilities such as rolling processability and extrusion processability before vulcanization and excellent in weather resistance and heat resistance and high in hardness after vulcanization is disclosed. This rubber composition comprises 100 parts by weight of an ethylene.α-olefin copolymer rubber and/or an isobutylene-isoprene rubbers, 3 to 60 parts by weight of a polybutadiene rubber which is liquid at room temperature and/or a polyisoprene rubber which is liquid at room temperature and 3 to 35 parts by weight of sulfur.

6 Claims, No Drawings

RUBBER COMPOSITIONS

BACKGROUND OF THE INVENTION

This invention relates to a rubber composition excellent in processabilities such as rolling processability and extrusion processability before vulcanization and excellent in weather resistance and heat resistance and high in hardness after vulcanization.

Ethylene.α-olefin rubbers and isobutylene-isoprene rubber (abbriviated to "IIR" hereinafter) have been widely used because of their excellent heat resistance and weather resistance.

However, when a high hardness rubber of at least 85 in hardness (as measured by the JIS-K6301 Hardness Tester Type A) is made from these rubbers there are practically many problems due to their very poor productivity and processabilities such as rolling processability and extrusion processability.

Hitherto, for production of such high hardness rubbers excellent in heat resistance and weather resistance there have been known, for example, a method according to which to ethylene.α-olefin rubber and/or IIR excellent in heat resistance and weather resistance are added reinforcing agents such as carbon black and inorganic fillers in a large amount and a softener and a plasticizer in a small amount and a method where a thermosetting alkylphenol resin is added to the rubbers.

However, the former method has problems in processing, namely, Mooney viscosity of the unvulcanized rubber mixture (referred to as "compound" hereinafter) raises sharply, the mixing performance of Banbury mixer and rolling processability of the compound are poor, and furthermore feedability of the compound to an extruder is inferior and even if it could be fed to the extruder the extrusion speed is very low and load of the extruder increases too much resulting in breakage.

According to the latter method the rolling processability and the extrusion processability can be improved as compared with the former method. However, this method still has the problem that since the curing reaction of the alkylphenol resin is a dehydration condensation reaction, water is produced with the curing reaction upon elevation of temperature to vulcanization temperature and this water is released in a gaseous form and acts as a foaming agent to cause incorporation of bubbles in vulcanized rubber when an atmospheric continuous vulcanization is employed.

This dehydration condensation reaction has high reaction speed and produces water instantaneously. Therefore, this water cannot be completely captured with a dehydrating agent such as calcium oxide.

The above method can be used when vulcanization is effected under pressures such as steam vulcanization or press vulcanization, but such vulcanization is inferior in productivity to the atmospheric continuous vulcanization.

SUMMARY OF THE INVENTION

It is, therefore, an object of this invention to provide a rubber composition for a high hardness rubber excellent in heat resistance and weather resistance and free from the problems mentioned hereinabove.

DESCRIPTION OF THE INVENTION

The above object is accomplished in accordance with this invention by providing a rubber composition which comprises 100 parts by weight of an ethylene.α-olefin rubber and/or IIR, 3 to 60 parts by weight of a polybutadiene rubber which is liquid at room temperature and/or a polyisoprene rubber which is liquid at room temperature and 3 to 35 parts by weight of sulfur. This rubber composition has excellent properties such as superior rolling processability and extrusion processability before vulcanization and high hardness when vulcanized.

The "ethylene.α-olefin rubber" used herein means a copolymer comprising ethylene, at least one α-olefin and a non-conjugated diene. The α-olefins include propylene, 1-butene, 1-penten, 1-hexene and the like and the non-conjugated diens include dicyclopentadiene, ethylidenenorbonene, 1,4-hexadiene, methyltetrahydroindene, methylnorbornene and the like.

The term "IIR" means isobutylene-isoprene copolymers and chlorides and bromides thereof.

The polybutadiene rubbers and the polyisoprene rubbers used in this invention are liquid at room temperature and have functional groups such as carboxyl group, hydroxyl group and the like in the main chain and at molecular end. However, the rubbers containing the above functional groups are not preferably to the homo type rubber, since those generally have so high compound Mooney viscosity or short scorch time that they harm rolling processability, extrusion processability of the compound.

The polybutadiene rubbers and polyisoprene rubbers used in this invention are not dependent on the bonding state, but for polybutadiene rubbers those having at least 50% of 1,2 vinyl bond are preferred because stability of unvulcanized rubber compositions against scorching is superior. Moreover, those which are adjusted in the number of double bond by hydrogenation reaction may also be used. However, those having a hydrogenation rate of more than 95% are low in crosslinking efficiency and it is difficult to obtain the desired high hardness rubbers therefrom. Thus, those of 95% or less in hydrogenation rate are preferred.

The molecular weight of the polybutadienes used in this invention is generally 700-10000 in terms of number-average molecular weight, preferably 700-4000, more preferably 1300-3000. The molecular wieght of the polyisoprenes used in this invention is generally 20000-60000 in terms of viscometric average molecular weight and those having a viscometric avarage molecular weight of 25000-50000 are especially preferred.

The above-mentioned preferable molecular weight ranges are based on the fact that when the molecular weight is less than said ranges the curing speed of the polybutadiene rubber and the polyisoprene rubber is low and thus the hardness of resulting rubber products is not sufficiently high while when more than said ranges the reduction of Mooney viscosity of unvulcanized rubber composition is small and thus the improvement in rolling proccessability and extrusion processability is not great.

Amount of polybutadiene rubber and polyisoprene rubber added is 3-60 parts by weight, preferably 10-50 parts by weight per 100 parts by weight of ethylene.α-olefin rubber and/or IIR.

When amount of polybutadiene rubber and polyisoprene rubber is less than 3 parts by weight, reduction in Mooney viscosity or increase in hardness of the compound is small and processability, hardness of rubber articles, etc. cannot be sufficiently improved. When the amount is more than 60 parts by weight, viscosity of the compound decreases. This decrease of viscosity contributes to improvement of processability, but lowers covulcanizability of ethylene.α-olefin rubber and/or IIR and polybutadiene rubber and polyisoprene rubber to cause considerable deteriorations in properties of vulcanized rubber such as reduction of tensile strength, increase of compression set, etc.

Amount of sulfur added is 3-35 parts by weight per 100 parts by weight of ethylene.α-olefin rubber and/or IIR. If the amount is less than said range, sufficient hardness cannot be obtained and if it is more than said range, crosslinking degree markedly increases and sufficiently high hardness can be obtained while breaking extension of vulcanized rubber considerably decreases and moreover a bad smell is given off at vulcanization step.

As mentioned hereinbefore, the rubber composition of this invention comprises an ethylene.α-olefin rubber or IIR or a mixture of the two at an optical ratio in which a polybutadiene rubber and/or a polyisoprene rubber and sulfur are incorporated. If desired, to the composition may further be added various secondary materials known as compounding ingredients for rubbers such as reinforcing agent, fillers, softeners, processing aids, antifoaming agents, zinc oxide, stearic acid, vulcanization accelerators, etc.

The rubber composition of this invention may be vulcanized by any methods such as press vulcanization, steam vulcanization, injection molding, a continuous vulcanization method of hot air vulcanization, UHF vulcanization, LCM vulcanization, PCM vulcanization, and combination of these continuous methods.

Thus, since the rubber composition of this invention has a low Mooney viscosity in unvulcanized state, it has excellent rolling processability and extrusion processability and can be vulcanized under atmospheric pressure. Furthermore, the composition can afford rubber articles of high hardness after vulcanization.

Because of these superior performances, the rubber composition of this invention has wide uses such as automobile parts, industrial parts, constructional materials, etc. As uses for automobile parts, mention may be made of packings, hoses, channel rubber, glass run rubber, weatherstrips, hard solid rubber portions in composites of a soft solid rubber and a hard solid rubber, solid rubber portions in composites of a solid rubber and a sponge rubber which are applied to door seals and truck seals, mudguards, etc. As the industrial parts there are rubber rolls, sealing materials, packing, etc. and as the constructional materials there are setting blocks, rubber tiles, gaskets, etc.

The following nonlimiting examples further illustrate this invention.

EXAMPLE 1

The formulation ingredients (1) as shown in Table 1 were mixed in the amounts (parts by weight) as shown in Table 1 by Banbury mixer. With this mixture were mixed the formulation ingredients (2) as shown in Table 1 in the amounts as shown in Table 1 by a roll to obtain compounds. (In Example 3 both the mixings were carried out by roll.) Thus obtained compounds were vulcanized at 160° C. for 30 minutes by a vulcanizing press. Properties of thus obtained vulcanized rubbers are shown in Table 2.

TABLE 1

| | Example of invention | | | | | Comparative Examples | |
|---|---|---|---|---|---|---|---|
| | 1 | 2 | 3 | 4 | 5 | 1 | 2 |
| Formulation ingredients (1) | | | | | | | |
| Esprene ® 512 F*[1] | 50 | | | | | | |
| Esprene ® 501 A*[1] | 50 | | | | | | |
| FEF Carbon Black | 150 | | | | | | |
| Paraffinic process oil | 40 | → | → | → | → | → | → |
| Zinc oxide No. 3 | 5 | | | | | | |
| Stearic acid | 1 | | | | | | |
| Nisso-PB ®-B 3000*[2] | 20 | | | | | | |
| Nisso-PB ®-C 1000*[3] | | 20 | | | | | |
| Nisseki Polybutadiene B 3000*[4] | | | 20 | | | | |
| Idemitsu Polybutadiene R45HT*[5] | | | | 20 | | | |
| Zeonpolyoil ® 130*[6] | | | | | 20 | | |
| BR-01*[11] | | | | | | | 20 |
| Formulation ingredients (2) | | | | | | | |
| Vesta ®-BS*[7] | 3 | | | | | | |
| Soxinol ® CZ*[8] | 1.5 | → | → | → | → | → | → |
| Soxinol ® TT*[8] | 0.6 | | | | | | |
| Soxinol ® BZ*[8] | 1 | | | | | | |
| Sulfur | 6 | 6 | 6 | 6 | 6 | 1.5 | 6 |

*[1]ENB type EPDM (Product of Sumitomo Chemical Co., Ltd.)
*[2]Polybutadiene (MW: 3000; 1,2 vinyl bond: at least 90%; Homotype; Product of Nippon Soda Co., Ltd.)
*[3]Polybutadiene (MW: 1350; 1,2 vinyl bond: at least 90%; COOH modified type; Product of Nippon Soda Co., Ltd.)
*[4]Polybutadiene (MW: 3000; 1,2 vinyl bond: 70%; Homotype; Product of Nippon Sekiyu Co., Ltd.)
*[5]Polybutadiene (MW: 2800; 1,2 vinyl bond: 20%; OH modified type; Product of Idemitsu Petrochemical Co., Ltd.)
*[6]Polybutadiene (MW: 3000; 1,2 vinyl bond: 1%; Homotype; Product of Nippon Zeon Co., Ltd.)
*[7]Antifoaming agent (Product of Inoue Sekkai Co., Ltd.)
*[8]Vulcanization accelerator (Product of Sumitomo Chemical Co., Ltd.)
*[11]Butadiene rubber (Product of Japan Synthetic Rubber Co., Ltd.)

TABLE 2

| | Example of this invention | | | | | Comparative Examples | |
|---|---|---|---|---|---|---|---|
| | 1 | 2 | 3 | 4 | 5 | 1 | 2 |
| $ML_{1+4}$ 100° C. | 72 | 89 | 76 | 75 | 81 | 162 | 156 |
| ML 120° C. $t_5$ (min) | 7.8 | 11.5 | 7.6 | 4.1 | 3.2 | 8.6 | 3.2 |
| Vulcanization 160° C. × 20 min by press | | | | | | | |
| $T_B$ (Kgf/cm$^2$) | 148 | 145 | 150 | 131 | 129 | 159 | 148 |
| $E_B$ (%) | 80 | 70 | 90 | 100 | 110 | 100 | 90 |
| $H_S$ (JIS-A) | 93 | 95 | 94 | 94 | 93 | 90 | 95 |
| Mixing processability of Banbury mixer | O | O | O | O | O | X | X |
| Rolling processability | O | O | O | O | O | X | X |
| Feedability to extruder | O | O | O | O | O | X | X |

EXAMPLE 2

Effects of addition amount of Niiso-PB ®-B 3000 added as a polybutadiene and effects of addition amount of sulfur were examined. Furthermore comparisons were made with thermosetting phenol resin. The results are shown in Table 3. Mixing formulation of ingredients and vulcanizing conditions were the same as in Example 1. Other ingredients than those as shown in Table 3 are shown in Table 4. These ingredients of Table 4 were used in all cases of this Example.

TABLE 3

| | Comparative Examples | | | | Examples of this invention | | | | |
|---|---|---|---|---|---|---|---|---|---|
| | 1 | 2 | 3 | 4 | 1 | 2 | 3 | 4 | 5 |
| Esprene ® 501A | 50 | 50 | 50 | | 50 | 50 | 50 | | |
| Esprene ® 512F | 50 | 50 | 50 | | 50 | 50 | 50 | 60 | |
| Esso Butyl ® 268*[9] | | | | 100 | | | | 40 | 100 |
| Nisso-PB ®-B 3000 | | | 15 | | 10 | 15 | 50 | 20 | 15 |
| Sumilite Resin ® PR-12687*[10] | | 15 | | | | | | | |
| Sulfur | 2 | 2 | 2 | 2 | 4 | 15 | 25 | 8 | 6 |
| Paraffinic process oil | 40 | 60 | 40 | 40 | 40 | 40 | 40 | 40 | 40 |
| Properties $ML_{1+4}$ 100° C. | 162 | 83 | 76 | 145 | 85 | 72 | 48 | 59 | 59 |
| Press vulcanization 160° C. × 20 min | | | | | | | | | |
| $T_B$ (Kgf/cm²) | 159 | 132 | 121 | 128 | 151 | 156 | 132 | 136 | 131 |
| $E_B$ (%) | 130 | 90 | 210 | 170 | 130 | 80 | 50 | 80 | 130 |
| $H_S$ (JIS-A) | 90 | 92 | 80 | 72 | 88 | 96 | 99 | 95 | 92 |
| Rolling processability | X | O | O | X | O | O | O | O | O |
| Feedability to extruder | X | O | O | X | O | O | O | O | O |
| Snappiness of vulcanized rubber | O | X | O | O | O | O | O | O | O |
| Foaming at hot air vulcanization | O | X | O | O | O | O | O | O | O |

*[9]Isobutylene-isoprene rubber (Product of Esso Petrochemical Co., Ltd.)
*[10]Thermosetting phenol resin (Product of Sumitomo Durez Co., Ltd.)

TABLE 4

| | |
|---|---|
| FEF Carbon | 150 |
| Zinc Oxide No. 3 | 5 |
| Stearic acid | 1 |
| Vesta ® BS | 3 |
| Soxino ® CZ | 1.5 |
| Soxino ® TT | 0.6 |
| Soxino ® BS | 1 |

EXAMPLE 3

Formulation ingredients as shown in Table 5 were mixed and vulcanized in the same manner as in Example 1. The results obtained are shown in Table 5.

TABLE 5

| | | Comparative Example | Examples of this invention | | | |
|---|---|---|---|---|---|---|
| | | 1 | 1 | 2 | 3 | 4 |
| Ingredient (1) | Esprene ® 512 F | 50 | | | | 50 |
| | Esprene ® 510 A | 50 | | | | 50 |
| | Mitsui Elastomer X3030*[12] | | → | → | → | 50 |
| | FEF Carbon | 110 | | | | 110 |
| | Paraffinic process oil | 10 | | | | 10 |
| | Kuraprene ® LIR 30*[13] | | 20 | | | |
| | Kuraprene ® 50*[14] | | | 20 | | 20 |
| | Kuraprene ® 410*[15] | | | | 20 | |
| | Zinc oxide No. 3 | 5 | 5 | 5 | 5 | 5 |
| | Stearic acid | 1 | 1 | 1 | 1 | 1 |
| Ingredient (2) | Vesta ® BS | 3 | | | | |
| | Soxinol ® CT | 1.5 | → | → | → | |
| | Soxinol ® CT | 0.6 | | | | |
| | Soxinol ® BZ | 1 | | | | |
| | Sulfur | 1.5 | 15 | 15 | 15 | 15 |
| Properties | $ML_{1+4}$ 100° C. | 137 | 69 | 77 | 83 | 67 |
| | $t_5$ 120° C. (Min) | 9.2 | 7.8 | 7.1 | 4.8 | 8.5 |
| | (Press vulcanization 160° C. × 30 min) | | | | | |
| | $T_B$ (Kgf/cm²) | 179 | 103 | 112 | 89 | 128 |
| | $E_B$ (%) | 200 | 170 | 170 | 150 | 210 |
| | $H_S$ (JIS-A) | 87 | 93 | 95 | 96 | 96 |
| Mixing Processability of Banbury mixer | | X | O | O | O | O |
| Rolling processability of unvulcanized rubber composition | | X | O | O | O | O |
| Feedability of unvulcanized rubber composition to extruder | | X | O | O | O | O |

*[12]Ethylene-1-butene-ENB copolymer rubber (Product of Mitsui Petrochemical Co., Ltd.)
*[13]Polyisoprene rubber (Viscometric average molecular weight: 29,000; Homotype; Product of Kuraray Isoprene Chemical Co., Ltd.)
*[14]Polyisoprene rubber (Viscometric average molecular weight: 47,000; Homotype)
*[15]Polyisoprene rubber (Viscometric average molecular weight: 25,000; Carboxyl modified type)

EXAMPLE 4

Effects of addition amount of Kuraprene ®LIR 50 used as a polyisoprene rubber and effects of addition amount of sulfur were examined. Moreover, comparison was made with thermosetting alkylphenol resin. The results are shown in Table 6. Mixing formulation of

TABLE 6

|  |  | Comparative Examples | | | | | Examples of this invention | | | | | | |
|---|---|---|---|---|---|---|---|---|---|---|---|---|---|
|  |  | 1 | 2 | 3 | 4 | 5 | 1 | 2 | 3 | 4 | 5 | 6 | 7 |
| Ingredients (1) | Esprene ® 512 F | 50 | 50 | 50 | 50 |  | 50 | 50 | 30 |  | 50 | 50 | 50 |
|  | Esprene ® 501 A | 50 | 50 | 50 |  |  | 50 | 50 | 30 |  | 50 | 50 | 50 |
|  | Esso Butyl 268 |  |  |  | 50 | 100 |  |  | 40 | 100 |  |  |  |
|  | Nisso-PB ® -B 3000 |  |  |  |  |  |  |  |  |  |  |  | 10 |
|  | Kuraprene ® LIR 50 |  | 20 |  | 2 |  | 15 | 30 | 45 | 20 | 20 |  | 10 |
|  | Hydrogenated LIR.HL-2*16 |  |  |  |  |  |  |  |  |  |  | 20 |  |
|  | Sumilite Resin ® PR 12687 |  |  | 15 |  |  |  |  |  |  |  |  |  |
|  | Paraffinic process oil | 10 | 10 | 20 | 10 | 10 | 10 | 10 | 10 | 10 | 10 | 10 | 10 |
|  | Sulfur | 6 | 2 | 3 | 15 | 3 | 7 | 15 | 25 | 20 | 15 | 15 | 7 |
|  | FEF Carbon | 110 | → | → | → | → | → | → | → | → | → | → | → |
|  | Zinc oxide No. 3 | 5 | | | | | | | | | | | |
|  | Stearic acid | 1 | | | | | | | | | | | |
| Ingredients (2) | Vesta ® BS | 3 | → | → | → | → | → | → | → | → | → | → | → |
|  | Soxinol ® CZ | 1.5 | | | | | | | | | | | |
|  | Soxinol ® TT | 0.6 | | | | | | | | | | | |
|  | Soxinol ® BZ | 1 | | | | | | | | | | | |
| Properties | $ML_{1+4}$ 100° C. | 135 | 88 | 102 | 140 | 128 | 86 | 72 | 61 | 75 | 77 | 78 | 70 |
|  | (Press vulcanization 160° C. × 30 min.) | | | | | | | | | | | | |
|  | $T_B$ (Kgf/cm$^2$) | 186 | 83 | 102 | 142 | 128 | 103 | 85 | 78 | 96 | 100 | 101 | 105 |
|  | $E_B$ (%) | 170 | 280 | 130 | 220 | 230 | 150 | 140 | 120 | 180 | 130 | 100 | 180 |
|  | $H_S$ (JIS-A) | 87 | 75 | 92 | 76 | 91 | 91 | 93 | 92 | 95 | 95 | 96 | 94 |
|  | Rolling Processability | X | O | O | X | X | O | O | O | O | O | O | O |
|  | Feedability to extruder | X | O | O | X | X | O | O | O | O | O | O | O |
|  | Foaming at hot air vulcanization | O | O | X | O | O | O | O | O | O | O | O | O |

*16Hydrogenated LIR.HL-2 (Viscometric average molecular weight: 25,000; Hydrogenation rate: 92%; Kuraray Isoprene Chemical Co., Ltd.)

ingredients and vulcanizing conditions were the same as in Example 1.

We claim:

1. A rubber composition which comprises 100 parts by weight of an ethylene α-olefin copolymer rubber 10 to 50 parts by weight of a polybutadiene rubber having at least 50% of 1,2 vinyl bond which is liquid at room temperature and/or polyisoprene rubber which is liquid at room tempreature and 4 to 25 parts by weight of sulfur.

2. A rubber composition according to claim 1 wherein the polybutadiene rubber has a number-average molecular weight of 700–10000.

3. A rubber composition according to claim 1 wherein the polybutadiene rubber has a number-average molecular weight of 700 to 4000.

4. A rubber composition according to claim 1 wherein the polyisoprene rubber has a viscometric average molecular weight of 20000 to 60000.

5. A rubber composition according to claim 1 wherein the polybutadiene rubber and polyisoprene rubber are those of homo type.

6. A rubber composition according to claim 1 wherein the ethylene.α-olefin copolymer rubber is a copolymer of ethylene, at least one α-olefin selected from propylene, 1-butene, 1-pentene and 1-hexene and a non-conjugated diene selected from dicyclopentadiene, ethylidenenorbornene, 1,4-hexadiene, methyltetrahydroindene and methylnorbornene.

* * * * *